United States Patent
Ostrander et al.

(10) Patent No.: US 9,328,833 B2
(45) Date of Patent: May 3, 2016

(54) RELIEF VALVE FOR VEHICLE COMPONENT

(75) Inventors: Robert J. Ostrander, Orchard Lake, MI (US); Christopher Steele, Lake Orion, MI (US); Anthony G. Lentini, St. Clair Shores, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 1788 days.

(21) Appl. No.: 12/501,538

(22) Filed: Jul. 13, 2009

(65) Prior Publication Data

US 2011/0005629 A1  Jan. 13, 2011

(51) Int. Cl.
*F16K 15/14* (2006.01)
*F16K 17/02* (2006.01)

(52) U.S. Cl.
CPC .............. *F16K 15/147* (2013.01); *F16K 17/02* (2013.01); *Y10T 137/7885* (2015.04)

(58) Field of Classification Search
CPC .. F16K 15/147; F16K 17/02; Y10T 137/7885
USPC .................. 137/849, 859, 493, 845
See application file for complete search history.

(56) References Cited

U.S. PATENT DOCUMENTS

| 571,708 | A | * | 11/1896 | Thompson ................. 137/845 |
| 2,239,192 | A | | 4/1941 | Cutting |
| 3,245,428 | A | * | 4/1966 | Klimak et al. ............. 137/493 |
| 3,736,953 | A | * | 6/1973 | Vaalburg .................... 137/430 |
| 4,308,729 | A | * | 1/1982 | Condon ...................... 464/16 |
| 4,475,737 | A | | 10/1984 | Cook, Jr. et al. |
| 4,762,308 | A | * | 8/1988 | Geno ...................... 267/64.27 |
| 5,562,546 | A | | 10/1996 | Koslowski et al. |
| 5,735,747 | A | | 4/1998 | Gehrke et al. |
| 5,836,823 | A | | 11/1998 | Shellaberger |
| 5,873,297 | A | * | 2/1999 | Stojic ........................ 91/444 |
| 6,183,370 | B1 | | 2/2001 | Lim |
| 6,243,937 | B1 | | 6/2001 | Craig et al. |
| 6,348,002 | B1 | | 2/2002 | Breese |
| 7,052,398 | B2 | | 5/2006 | Robb |

FOREIGN PATENT DOCUMENTS

| JP | 2001082442 A | 3/2001 |
| JP | 2002213631 A | 7/2002 |

* cited by examiner

*Primary Examiner* — Kevin Lee
*Assistant Examiner* — P. Macade Nichols
(74) *Attorney, Agent, or Firm* — Brooks Kushman P.C.

(57) ABSTRACT

A vehicle component includes an opening that receives a plug. A relief valve is mounted to the plug and has at least one elongated passage extending through a flexible membrane that is movable between a venting position and a sealed position.

19 Claims, 2 Drawing Sheets

RELIEF VALVE FOR VEHICLE COMPONENT

TECHNICAL FIELD

This invention generally relates to a relief valve for a vehicle component that allows bi-directional flow through the relief valve.

BACKGROUND OF THE INVENTION

Driveline slip yokes for drive shaft assemblies include a plug that is inserted into an open end face near a universal joint. The slip yoke has an internal bore at the open face that includes a splined surface that mates with a spline shaft member. The plug covers exposed ends of the splines. Traditionally, the plug includes a central circular hole that is defined by an axis parallel to a centerline of the splines. This hole compensates for pressure generated within the slip yoke due to axial movement of the spline shaft member within the internal bore.

When the spline shaft member moves outward to extend the length of the drive shaft assembly, a vacuum is created within a cavity that is formed between an end of the spline shaft member and the plug. Similarly, when the spline shaft member moves inward to shorten the length of the drive shaft assembly, pressure is formed within the cavity between the end of the spline shaft member and the plug. The central circular hole in the plug allows for movement of air inward and outward to equalize pressure between the outside and inside the slip yoke assembly. If the spline shaft member is moved outwardly, the slip shaft assembly can become contaminated at the spline shaft member seal interface because of the vacuum created in the cavity. If the increase of atmospheric pressure is not equalized when the spline shaft member is moved inward, the plug inserted in the end of the slip yoke can be pushed out of position, which would expose the splines to potential contamination in addition to allowing leakage of lubricating fluids.

One disadvantage with this current configuration is that with the current circular hole configuration, the hole itself is a leak path for external contaminants such as water, salt, dirt, etc. Thus, there is a need for an improved slip yoke plug configuration.

SUMMARY OF THE INVENTION

A vehicle component includes a plug and relief valve that that allows bi-directional flow for venting purposes while preventing external contaminates from entering an internal cavity of the vehicle component.

In one example, a slip yoke assembly includes a slip yoke with a plug received within an open end. The relief valve is mounted within the plug and allows bi-directional flow for venting purposes while preventing external contaminates from entering the slip yoke.

In one example, the relief valve has at least one elongated passage extending through a flexible membrane that is movable between a venting position and a sealed position.

In one example, the relief valve includes an attachment portion formed about an outer periphery which serves to seat the relief valve within an opening formed within the plug. In one example the attachment portion comprises a groove. The flexible membrane is located radially inwardly relative to the groove.

In one example, the at least one elongated passage comprises an elongated slit. A single slit can be used or a plurality of slits can be used. When venting, flaps of the slit open to allow equalization of air pressure on either side of the plug. When closed, the flaps of the slit contact each other to provide a sealed interface that prevents contaminants from entering the internal cavity of the vehicle component.

In another example, a brake assembly includes a brake component with the plug relief valve that allows bi-directional flow for venting purposes while preventing external contaminates from entering an internal cavity of the brake component.

These and other features of the present invention can be best understood from the following specification and drawings, the following of which is a brief description.

DETAILED DESCRIPTION OF THE PREFERRED EMBODIMENT

Figure 1:
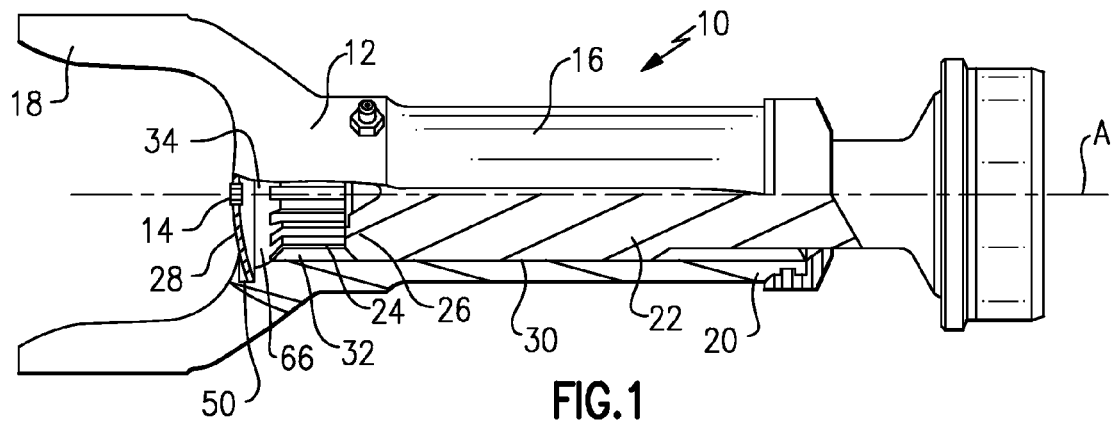
FIG. 1 is a side view of a slip yoke assembly with a plug and relief valve.

FIG. 1 illustrates a vehicle component that is configured to provide internal pressure relief. In one example, the vehicle component is a slip yoke assembly 10 that includes a slip yoke 12 and a relief valve 14. The slip yoke assembly 10 includes a slip shaft body 16 that extends along a central yoke axis A and a yoke portion 18 that is connectable to another yoke portion (not shown) as known to form a joint assembly. The yoke portion 18 is formed at one end of the slip yoke assembly 10 and an opposite end 20 of the slip yoke assembly 10 is connectable to a shaft 22 that has a splined surface 24 extending about an outer periphery of one shaft end 26.

A plug 28 is installed within the slip yoke assembly 10, and the relief valve 14 is supported by the plug 28. The slip shaft body 16 includes an internal central bore 30 that includes a mating splined surface 32 that connects to the splined surface 24 of the shaft 22. The central bore 30 is closed at one end by the shaft 22 and is open at an opposite shaft end near the yoke portion 18 as indicated at 34. The relief valve 14 is supported in the plug 28 by the slip yoke assembly 10 near the yoke portion 18 to enclose the central bore 30 at the open end 34.

Figure 2:
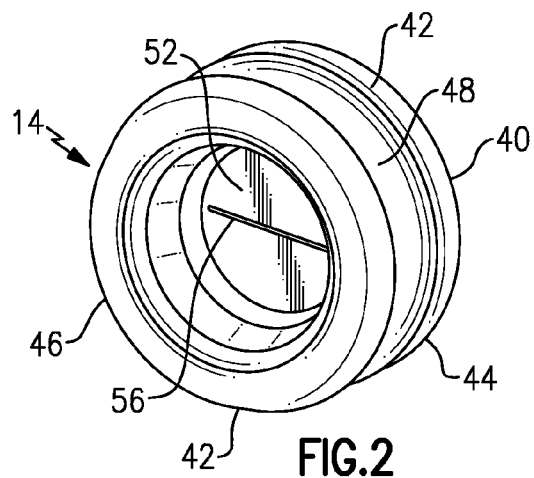
FIG. 2 is a perspective view of the relief valve of FIG. 1.
Figure 3A:
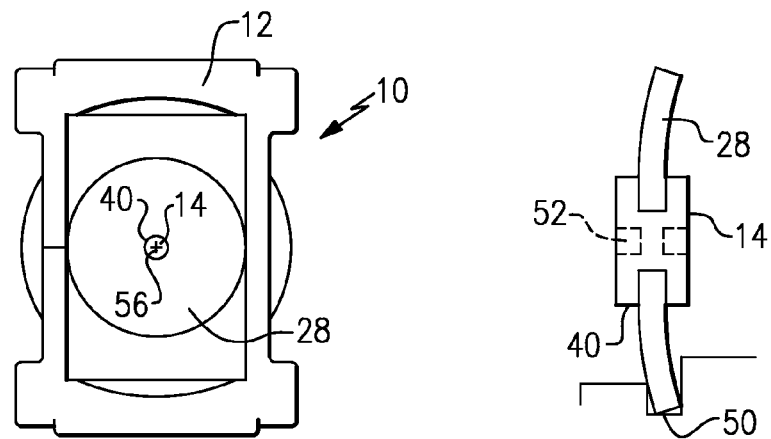
FIG. 3A is an end view of FIG. 1.
Figure 3B:
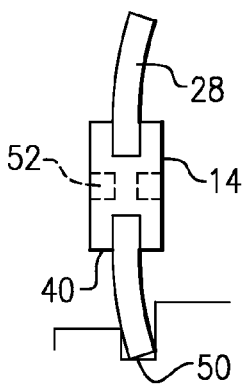
FIG. 3B is a side view of FIG. 1.

The relief valve 14 is shown in greater detail in FIGS. 2, 3A, and 3B. The relief valve 14 includes an attachment portion 40 that attaches to an opening formed within the plug 28. In one example, the attachment portion 40 is comprised of enlarged diameter flange portions 42 that are formed at inner 44 (facing the central bore 30) and outer 46 (facing away from the central bore 30) edges of the relief valve 14. Between the enlarged diameter flange portions 42 is a reduced diameter groove 48. The groove 48 seats within the opening of the plug 28 to securely hold the relief valve 14 in place.

An edge of the plug 28 seats within a groove 50 formed at the open end 34 of the slip yoke assembly 10. The plug 28 comprises a rigid, non-flexible member, which is made of metal or plastic for example. Further, the plug 28 can comprise a curved or flat member.

The relief valve 14 includes a thin, flexible membrane 52 that is located radially inwardly of the attachment portion 40. The flexible membrane 52 includes at least one elongated passage 56 that extends axially across the flexible membrane 52. The elongated passage 56 is defined by a length dimension that extends in a direction that is non-parallel to the central yoke axis A.

The relief valve 14 is made from a non-corrosive, generally flexible material such as rubber or other polymer materials for example. This allows the relief valve 14 to be easily installed within the plug 28 and provide movement of the flexible membrane 52.

In the example shown in FIGS. 2, 3A, and 3B the elongated passage 56 comprises a slit that is formed across the flexible membrane 52. As shown, the slit is significantly greater in a length dimension than a height dimension. In response to non-equalized pressures on opposing sides of the relief valve 14, the flexible membrane 52 is movable between a venting position and a sealed position.

Figure 4A:
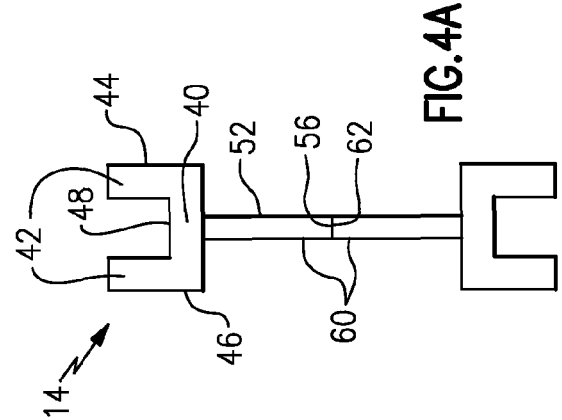
FIG. 4A is a schematic side view of the relief valve in a sealed position.

FIG. 4A shows the flexible membrane in the sealed position. The elongated passage 56 provides flaps 60 that are in contact with each other along their edges 62 when in the sealed position. This prevents contaminants such as dirt, salt, water, etc. from entering the central bore 30.

Figure 4B:
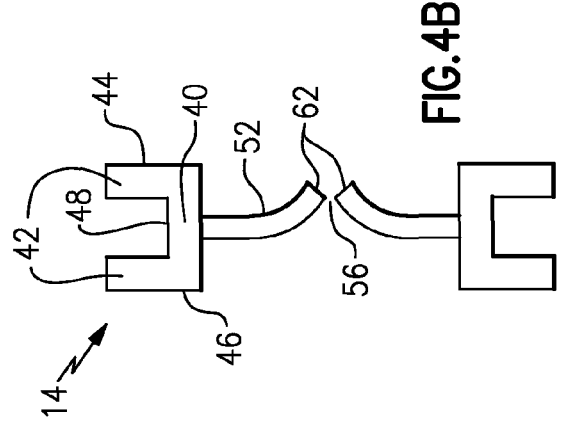
FIG. 4B is a schematic side view of the relief valve in one venting position.
Figure 4C:
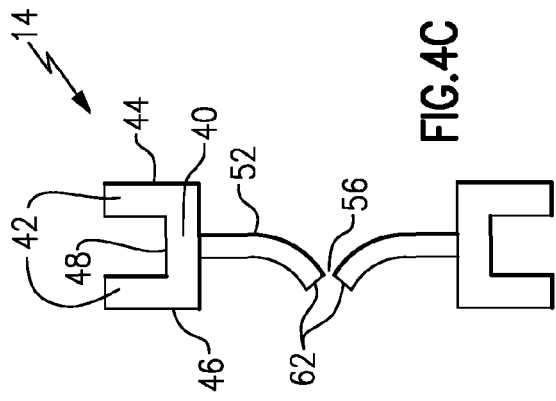
FIG. 4C is a schematic side view of the relief valve in another venting position.

The flexible member 52 allows bi-directional flow through the relief valve 14 to equalize the atmospheric differential pressures within a cavity 66 (FIG. 1) provided between the end of the shaft 22 and the relief valve 14 inserted within the central bore 30 of the slip yoke 10. Axial movement of the shaft 22 within the central bore 30 of the slip yoke 10 can vary atmospheric pressures within the cavity. The flexible membrane 52 can either flex inwardly (FIG. 4B) or outwardly (FIG. 4C) along the axis A to equalize atmospheric pressures as needed. Thus, the bi-directional flow through the elongated passage 56 of the flexible membrane 52 equalizes the atmospheric pressure between the outside and inside of the slip yoke assembly in a simple manner that still provides a sealed interface when the pressure have been equalized (FIG. 4A).

Figure 5A:
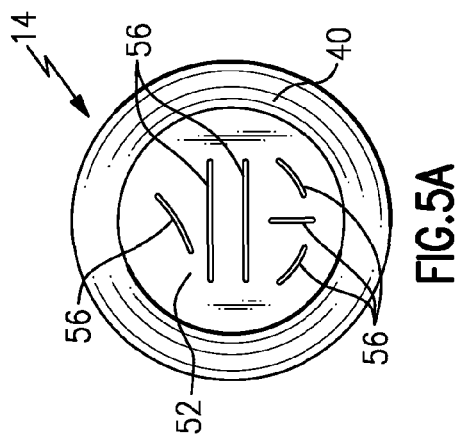
FIG. 5A is a schematic end view of the relief valve showing a configuration with a plurality of elongated passages.
Figure 5B:
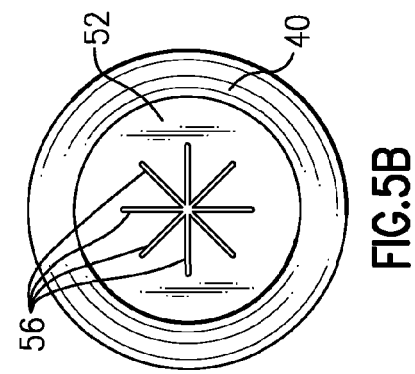
FIG. 5B is a schematic end view of the relief valve showing another example configuration for elongated passages.
Figure 6:
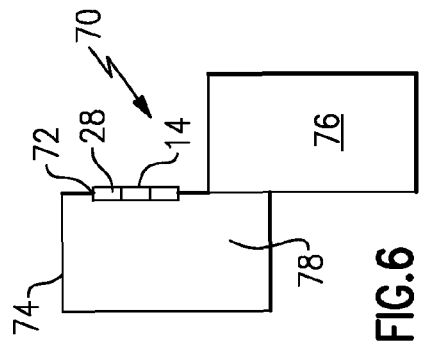
FIG. 6 is a schematic view of a brake assembly including the plug and relief valve.

It should be understood that while a single elongated passage 56 is shown, the flexible membrane 52 could include multiple elongated passages 56 as shown in FIGS. 5A and 5B. Further, the elongated passages can be oriented in many different axial orientations across the flexible membrane 52. Also, while shown as generally straight lines, the elongated passages could also include non-linear portions, such as curved arcs, and may or may not intersect each other FIG. 6 shows another example of a vehicle component that includes the plug 28 and relief valve 14. In this example, the vehicle component comprises a vehicle brake mechanism 70. The plug 28 and relief valve are installed within an opening 72 formed within a housing 74 for an air chamber that is used to actuate a brake 76. The relief valve 14 allows bi-directional flow through the relief valve 14 to equalize the atmospheric differential pressures within a cavity 78 in the air chamber.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A valve assembly for a vehicle component comprising:
a plug to be inserted within an opening formed in a vehicle component; and
a relief valve mounted to said plug, said relief valve having at least one elongated passage extending through a flexible membrane, wherein said flexible membrane is movable between a venting position to allow pressurized air to vent to atmosphere and a sealed position to prevent contaminants from entering the vehicle component;
wherein said relief valve includes an attachment portion formed about an outer periphery with said flexible membrane being located radially inwardly of said attachment portion, said attachment portion being attachable to a plug opening formed within said plug; and
wherein said attachment portion includes a groove formed about said outer periphery to seat said relief valve within said plug.

2. The valve assembly according to claim 1 wherein said attachment portion includes enlarged flange portions at inner and outer end faces of said relief valve, said groove being formed as a reduced diameter portion between said enlarged flange portions.

3. The valve assembly according to claim 1 wherein said plug defines a central axis, and wherein said at least one elongated passage comprises at least one slit that extends in a direction that is non-parallel to said central axis.

4. The valve assembly according to claim 3 wherein said at least one slit comprises a plurality of slits.

5. The valve assembly according to claim 3 wherein said at least one slit provides a pair of movable flaps wherein said flaps are in contact with each other when in said sealed position and wherein said flaps move out of contact with each other inwardly or outwardly relative to said plug opening when said flexible membrane is in said venting position.

6. The valve assembly according to claim 3 wherein said at least one slit is significantly greater in a length dimension than a height dimension.

7. The valve assembly according to claim 1 wherein said relief valve is comprised of a flexible rubber or polymer material.

8. The valve assembly according to claim 1 wherein the vehicle component comprises a slip yoke with a central bore having an open end, and wherein said plug is received within said central bore to enclose said open end.

9. The valve assembly according to claim 1 wherein the vehicle component comprises a brake component with a housing having an opening to an internal cavity, and wherein said plug is received within said opening.

10. The valve assembly according to claim 1 wherein the vehicle component comprises a housing for a brake air chamber.

11. The valve assembly according to claim 1 wherein said flexible membrane includes at least one pair of movable flaps defined by edges, and wherein said edges of said movable flaps remain in contact with each other along an entire length of said edges when in said sealed position.

12. A vehicle component comprising:
a vehicle component body including an opening to an internal cavity formed within said vehicle component;
a plug inserted within said opening to substantially enclose said internal cavity; and
a relief valve mounted in a plug opening formed within said plug, said relief valve having at least one elongated passage extending through a flexible membrane, wherein said flexible membrane is movable between a venting position and a sealed position to allow bi-directional flow from said internal cavity to equalize atmospheric pressures between said internal cavity within said vehicle component and an outside environment external to said vehicle component.

13. The vehicle component according to claim 12 wherein said vehicle component body comprises a slip yoke.

14. The vehicle component according to claim 12 wherein said vehicle component body comprises a brake component.

15. The vehicle component according to claim 14 wherein said brake component comprises a brake air chamber housing.

16. The vehicle component according to claim 12 wherein said at least one elongated passage comprises at least one slit.

17. The vehicle component according to claim 16 wherein said at least one slit provides a pair of movable flaps wherein said flaps are in contact with each other when in said sealed position and wherein said flaps move out of contact with each other inwardly or outwardly relative to said plug opening when said flexible membrane is in said venting position.

18. The vehicle component according to claim 12 wherein said flexible membrane includes at least one pair of movable flaps defined by edges, and wherein said edges of said movable flaps remain in contact with each other along an entire length of said edges when in said sealed position.

19. The vehicle component according to claim 12 wherein said venting position allows pressurized air to vent to atmosphere and said sealed position prevents contaminants from entering said internal cavity.

* * * * *